(12) United States Patent
Lindig

(10) Patent No.: US 6,477,892 B1
(45) Date of Patent: Nov. 12, 2002

(54) METHODS AND SYSTEMS FOR ASCERTAINING THE ROUGHNESS OF A PRINT MEDIA SURFACE

(75) Inventor: Darin D. Lindig, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 84 days.

(21) Appl. No.: 09/640,464

(22) Filed: Aug. 15, 2000

(51) Int. Cl.⁷ ................................................ G01B 5/28
(52) U.S. Cl. .......................................... 73/105; 73/159
(58) Field of Search ........................... 73/104, 105, 159

(56) References Cited

U.S. PATENT DOCUMENTS

| | | | |
|---|---|---|---|
| 3,470,739 A | * 10/1969 | Takafuji et al. ................ 73/105 |
| 4,139,765 A | * 2/1979 | Pomey ........................... 377/8 |
| 4,811,594 A | * 3/1989 | Dvorsky ....................... 73/105 |
| 4,888,983 A | 12/1989 | Dunfield et al. ............... 73/104 |
| 4,897,670 A | * 1/1990 | Hasegawa et al. .......... 347/193 |
| 5,162,660 A | 11/1992 | Popil |
| 5,614,662 A | 3/1997 | Hallan et al. .................. 73/105 |
| 5,684,707 A | 11/1997 | Rogowski |
| 5,689,757 A | 11/1997 | Ferrante et al. |
| 5,934,140 A | * 8/1999 | Jackson et al. ................ 73/159 |
| 5,948,972 A | * 9/1999 | Samsavar et al. ............. 73/105 |
| 6,067,162 A | 5/2000 | Hagen et al. |

FOREIGN PATENT DOCUMENTS

| | | | |
|---|---|---|---|
| JP | 60-255462 | * 12/1985 | .................... 73/159 |
| JP | 61-83069 | * 4/1986 | .................. 400/708 |
| JP | 63-62752 | * 3/1988 | .................. 400/708 |

* cited by examiner

*Primary Examiner*—Daniel S. Larkin

(57) ABSTRACT

Methods and systems for ascertaining the roughness of a print media surface are described. In one embodiment, a print media roughness detection mechanism comprises a surface-engaging member that is configured to physically engage a print media surface. A reflective member is provided and is joined with the surface-engaging member. One or more light sources are provided in operable proximity to the reflective member and are configured to project light energy toward the reflective member. A position detector is mounted in operable proximity to the reflective member and is configured to receive light energy that is reflected from the reflective member. The surface-engaging member is configured for displacement by the print media's surface in accordance with variations in the roughness of the surface sufficiently so that light that is reflected by the reflective member and received by the position detector can be utilized to ascertain a measure of the print media's roughness. In one embodiment, the print media roughness detection mechanism is implemented in connection with a printing device, such as a laser or ink jet printer, and print parameters can be manipulated in accordance with roughness measures that are provided by the detection mechanism.

13 Claims, 5 Drawing Sheets

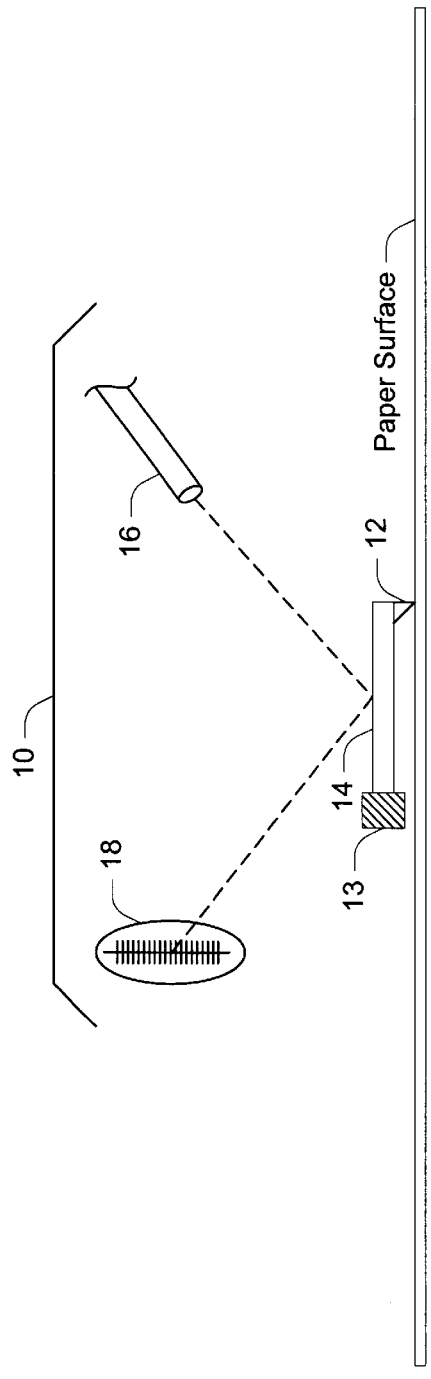
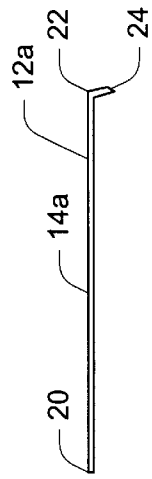
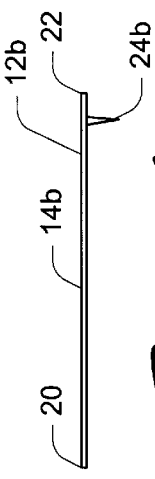
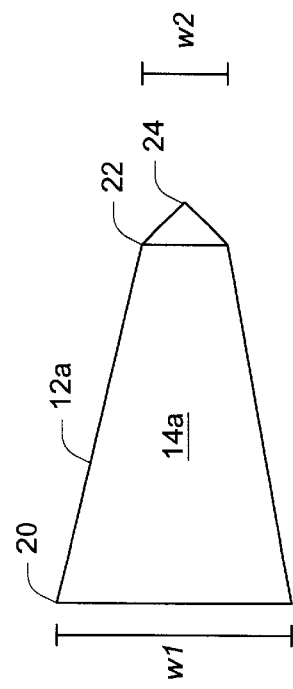

METHODS AND SYSTEMS FOR ASCERTAINING THE ROUGHNESS OF A PRINT MEDIA SURFACE

TECHNICAL FIELD

The present invention relates to methods and systems for ascertaining the roughness of a print media surface. More particularly, aspects of the invention relate to printing methods and systems that ascertain the roughness of a print media surface.

BACKGROUND

There are many reasons why it is beneficial to ascertain the roughness of a print media surface, such as a paper surface. For example, in manufacturing processes, it is desirable for paper to be of a generally uniform roughness. By ascertaining the roughness of a paper surface, one can ascertain whether paper that is mass produced has a uniform degree of roughness. In printing processes, roughness determinations can assist in setting certain printing parameters, such as the amount of toner that is used and the toner parameters that govern the toner's use.

In manufacturing scenarios, there have been methods and systems evolve for ascertaining the roughness of a paper surface. One typical method is the so-called Parker Surface Roughness Test (Print Surf) method. This method measures the air which passes between the surface of a coated paper and a flat surface of either steel or rubber. The apparatus that is used to carry out such a test is very expensive, is not portable, and requires a laboratory staff and space. More importantly the test lacks a high resolution for the smoothest surfaces.

In printing scenarios (such as etectrostatographic reproduction of images, e.g. electrophotography, and laser printing, as well as thermal ink jet, and thermal transfer reproduction of images), copy quality is sensitive to and can be affected by the level of roughness of the paper. Distinct variations can exist as to the level of paper roughness found in individual copy sheets, such as paper, that are used in printing devices. Additionally, individuals using such printing devices are typically free to switch the print media or paper upon which printing takes place. For example, in an office environment, less expensive draft paper might be used for preparing draft versions of different documents, while more expensive paper might be used for final versions of the documents. The characteristics of these different types of paper, including roughness, can vary widely.

Various machine parameters can be affected by the roughness of the paper to be processed through the machine. Based on the paper's roughness level, these parameters can be adjusted for their optimum functionality within the machine as well as for achieving optimum copy quality. For example, an ideal goal in electrophotography is to have the correct amount of toner deposited onto a copy sheet on a continuous basis. With poor development control, two situations occur. First, concerning a variability of toner quantity applied, too little toner creates lighter images, where too much toner creates darker images and may cause toner to appear in non-image areas. Second, concerning the machine, too much toner development causes excess toner waste which increases the expense of running the machine. Replacement of these components is thereby required on a more frequent basis. The need for precise toner control is intensified in color development systems where individual color images are superimposed on each other to create the full color image.

A rougher paper surface contains a greater surface area than a smoother paper surface, and may therefore require application of a higher developed toner mass per unit area to get the same dark, uniform, sharp copy quality. Additionally, if a greater amount of toner is required on a rougher paper surface, the development voltage, and/or the toner concentration, and/or the fuser set temperature must be raised to assure that the toner is completely fused to the paper. Under-fused toner on a substrate creates toner adhesion and durability issues which can include smears, flaking toner at paper folds, and integrity during.handling. An increased voltage may also be required for the corona generating devices associated with both the charging element, as well as the transfer element, for a rougher surface paper requiring a greater amount of toner deposited thereon. Uniformly increasing machine parameters, such as the fuser set temperature, fuser dwell time, or voltage level to the charging device, transfer device or developer may eliminate certain copy quality problems on rougher surface papers, however, other negative factors can be created. For example, increased stress on these affected components causes the need for more frequent component repair or replacement. Furthermore, the. increased power required to run the component at the higher settings can result in increased energy consumption and cost. Machines that can optimize copy quality as well as internal processing operations will have a greater latitude of operation and a competitive edge.

Several widely used, indirect, methods of paper surface roughness measurement, characterized as Sheffield smoothness, Bekk smoothness, and Parker Print Surf (described above), include air leak techniques which measure the volume of air that leaks, over a fixed time interval, between the paper surface and a test equipment seal, or, conversely, the time required for the leakage of a fixed air volume. Although these indirect surface roughness measurement methods offer a numerically quantified, relative value of surface roughness, they have not proven to be consistent, reliable indicators of print quality.

Accordingly, this invention arose out of concerns associated with providing improved methods and systems for ascertain the roughness of a print media surface.

SUMMARY

Methods and systems for ascertaining the roughness of a print media surface are described. In one embodiment, a print media roughness detection mechanism comprises a surface-engaging member that is configured to physically engage a print media surface. A reflective member is provided and is joined with the surface-engaging member. One or more types of light sources are provided in operable proximity to the reflective member and are configured to project light energy toward the reflective member. A position detector is mounted in operable proximity to the reflective member and is configured to receive light energy that is reflected from the reflective member. The surface-engaging member is configured for displacement by the surface in accordance with variations in the roughness of the surface sufficiently so that light that is reflected by the reflective member and received by the position detector can be utilized to ascertain a measure of the surface's roughness.

In another embodiment, a printing device comprises a printer that is configured to print upon a print media. A surface-engaging member is associated with the printer and is configured to physically engage a print media surface. The surface-engaging member comprises a flexure material body that is supported in a cantilevered disposition proximate a piece of print media to be printed upon by the printer. A reflective member is joined with the surface-engaging member and one or more light sources are disposed in operable proximity to the reflective member. The light source(s) is(are) configured to project light energy toward the reflective member. A position detector is mounted in operable proximity to the reflective member and is configured to receive light energy that is reflected from the reflective member. The surface-engaging member is configured for displacement by the surface in accordance with variations in the roughness of the surface sufficiently so that light that is reflected by the reflective member and received by the position detector can be utilized to ascertain a measure of the surface's roughness. In one aspect, roughness measures are used to modulate or adjust one or more printing parameters that are associated with printing that is to take upon the surface. Such printing parameters can include various toner parameters, such as fusing temperature, fusing time, and the like.

In yet another embodiment, a method of detecting the roughness of a print media surface comprises engaging a print media surface with a surface-engaging member. Light energy is projected towards a reflective member that is associated with the surface-engaging member in a manner in which the light energy is reflected by the reflective member. The light energy that is reflected by the reflective member is received, and from the received light energy, a roughness measurement of the print media surface's roughness is ascertained.

BRIEF DESCRIPTION OF THE DRAWINGS

FIG. 1 is a side elevational view of an exemplary print media roughness detection mechanism in accordance with one described embodiment.

FIG. 2 is a top plan view of an exemplary surface-engaging member in accordance with one described embodiment.

FIGS. 3 and 4 are side elevational views of exemplary surface-engaging members in accordance with two described embodiments.

DETAILED DESCRIPTION

Print Media Roughness Detector

Figure 5:
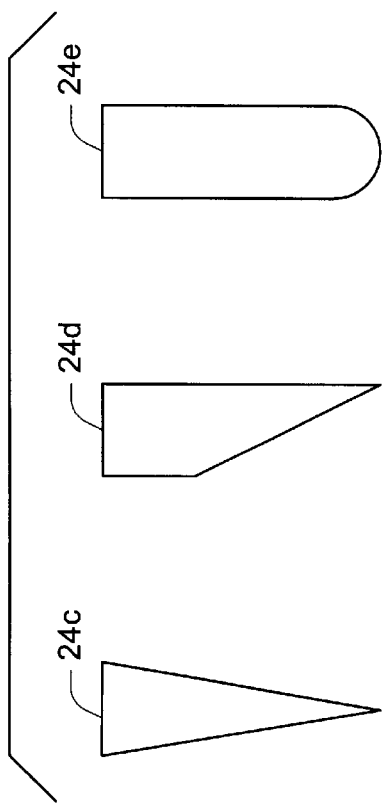
FIG. 5 is a side elevational view of various tip portion constructions in accordance with the described embodiments.

FIG. 1 shows a print media roughness detection mechanism 10 in accordance with one embodiment. In this particular embodiment, the print media comprises paper. It is to be understood, however, that other print media that are not necessarily paper in nature could be used in connection with the techniques described below. Examples of such other print media include, without limitation, transparencies and glossies.

In this particular embodiment, the detection mechanism comprises a surface engaging member 12 that is configured to physically engage the surface of a piece of paper as shown. The surface engaging member 12 can be supported in any manner in which it can engage the surface of a piece of paper. The surface engaging member is mounted on some type of support structure 13 which, in one example described below, can comprise the internal structure of a printing device, such as a laser or ink jet printer. The surface engaging member 12 is, in this example, supported in a cantilevered disposition over the paper's surface. It will be appreciated, however, that other operable dispositions could be utilized without departing from the spirit and scope of the invention.

A reflective member 14 is provided and, in this example, is joined with the surface engaging member. Any suitable reflective material can be utilized for the reflective member. The reflective member can comprise an integral part or component of the surface engaging member 12. Alternately, the reflective member can comprise a separate part or component that is connected to the surface engaging member 12. One or more light sources or types of light sources are provided, with an exemplary light source 16 being shown mounted in operable proximity to the reflective member 14. Any suitable light source can be utilized. For example, a suitable laser or LED source can be used to implement light source 16. In addition, a position detector 18 is provided and is mounted in operable proximity to reflective member 14. The position detector can comprise any suitable position detector from which relative position can be ascertained from reflected light. For example, a photo-detector, such as a photodiode, can be utilized to implement the position detector. Additionally, position-sensing photodiodes (PSDs) can be utilized.

In practice, as relative movement occurs between the surface engaging member 12 and the paper surface due to the roughness of the paper's surface, the surface engaging member 12 will be displaced (in this example vertically) an amount that is proportional to the roughness of the paper. Light source 16 projects a light onto the reflective member 14. This light is reflected by the reflective member 14 onto the position detector 18. As the surface engaging member 12 is displaced due to the roughness of the paper's surface, the reflected light will move along the position detector 18. As diagrammatically shown by the position detector's hash marks, the position detector is calibrated in a manner such that minute displacements of the surface engaging member 12 are translated to light movements along the position detector 18. The measured light movements along the position detector can be mapped or otherwise processed to provide roughness values or measurements that give an indication of the surface's roughness.

Exemplary surface engaging member

As was mentioned in the above example, the surface engaging member 12 is supported in a cantilevered disposition proximate the surface of a paper. In one exemplary embodiment, the surface engaging member comprises a thin flexure material that is dimensioned so that it can be resiliently displaced by the surface of a piece of paper as relative movement occurs between the member 12 and the paper's surface. As an example, consider that the surface engaging member can be fixed in placed while the paper is moved relative to the member 12. Any suitable material can be utilized to form the surface engaging member or flexure. Exemplary materials include, without limitation, metal, ceramics, and various other materials that will be apparent to those of skill in the art. Various types of thin metal flexures can be formed from thin steel or aluminum through suitable manufacturing techniques, such as stamping and the like. When metal is utilized as the flexure material, it is possible for the upper surface of the metal flexure to be used as a reflective member 14.

Consider, for example, FIGS. 2–4 which show various aspects of exemplary surface engaging members.

FIG. 2 is a top plan view of an exemplary surface engaging member 12a in the form of a metal flexure. Flexure 12a has, in this example, first and second ends 20, 22 which provide a body. In the particular construction shown, first end 20 is generally wider than second end 22, with the flexure body tapering between the two ends. It will be appreciated, however, that FIG. 2 constitutes but one exemplary footprint of a suitable flexure and that other footprints could be provided without departing from the spirit and scope of the invention.

In this particular example, first end 20 can be dimensioned to be about 5 mm in width (indicated by w1) and second end 22 can be dimensioned to be about 2 mm in width (indicated by w2). Reflective member 14a is provided by the top surface of member 12a, or can be a separately provided reflective component. Adjacent second end 22, an integral tip portion 24 projects downwardly (generally into the plane of the page upon which FIG. 2 appears). The length of the tip can be any suitable length, with an exemplary length being about 2 mm. In this example, the tip portion 24 is integral with the body of the flexure. That is, it is desirably formed from the same material from which the body is formed, and at the same time. The length of the flexure can be suitable length, with an exemplary length being from between about 10 cm to one inch.

FIG. 3 shows an elevational side view of the FIG. 2 flexure 12a. The thickness of the flexure is desirably one that can accommodate resilient movement in response to roughness variations of paper surfaces. In this spirit, any suitable thickness can be used. If metal material is utilized to form the flexure, then a thickness of around 0.1 mm can be sufficient, depending on the metal material.

FIG. 4 shows a flexure construction in accordance with another embodiment. Like numerals are utilized from the FIG. 3 embodiment to depict like elements, with differences being indicated with the suffix "b".

FIG. 4 shows another flexure construction 12b in which the tip portion 24b is not integral with the flexure body. Rather, in this example, the tip portion 24b is separate from, yet attached to or connected with the flexure proximate second end 22. Any suitable material can be used to form the tip portion. For example, the tip portion can be formed from hardened steel or ceramic material. Other materials can, of course, be utilized.

Various tip portion constructions can be utilized. Consider, for example, FIG. 5 which shows but three exemplary tip portion constructions separately designated at 24c, 24d, and 24e. Tip portion 24c is a needle tip construction that is exemplified in FIG. 4. Tip portion 24d is a chisel tip construction that is exemplified in FIG. 3. Tip portion 24e is a rounded tip construction that can be used as an alternative to the other illustrated tip constructions.

Exemplary Embodiment

The above-described detection mechanism can be utilized in a variety of scenarios in which it is desirable to detect the roughness of a paper surface. The described construction is advantageous in that it is small in size and has only a small number of components. Additionally, direct measurements of the paper surface topography can be provided (as contrasted with the indirect measurement techniques of the past). Further, the inventive constructions require little or no user input, and can be conveniently configured for automated use. One such automated use can occur within the confines of a printing device.

Figure 6:
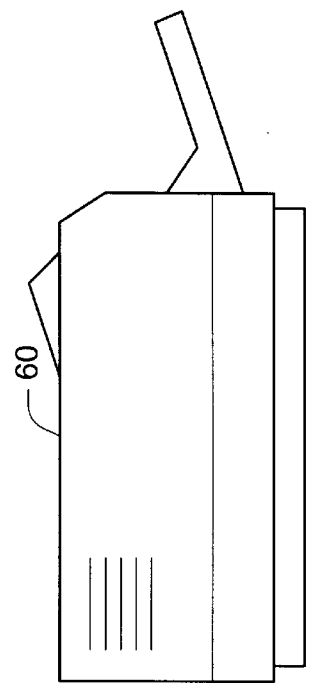
FIG. 6 is a side elevational view of an exemplary device in which an inventive print media roughness detection mechanism can be employed.

FIG. 6 shows an exemplary printing device in the form of a laser printer or ink jet printer 60. Printer 60 can be any suitable printer for which it is desirable to determine the roughness of paper. Exemplary printers are available from the assignee of this document.

Figure 7:
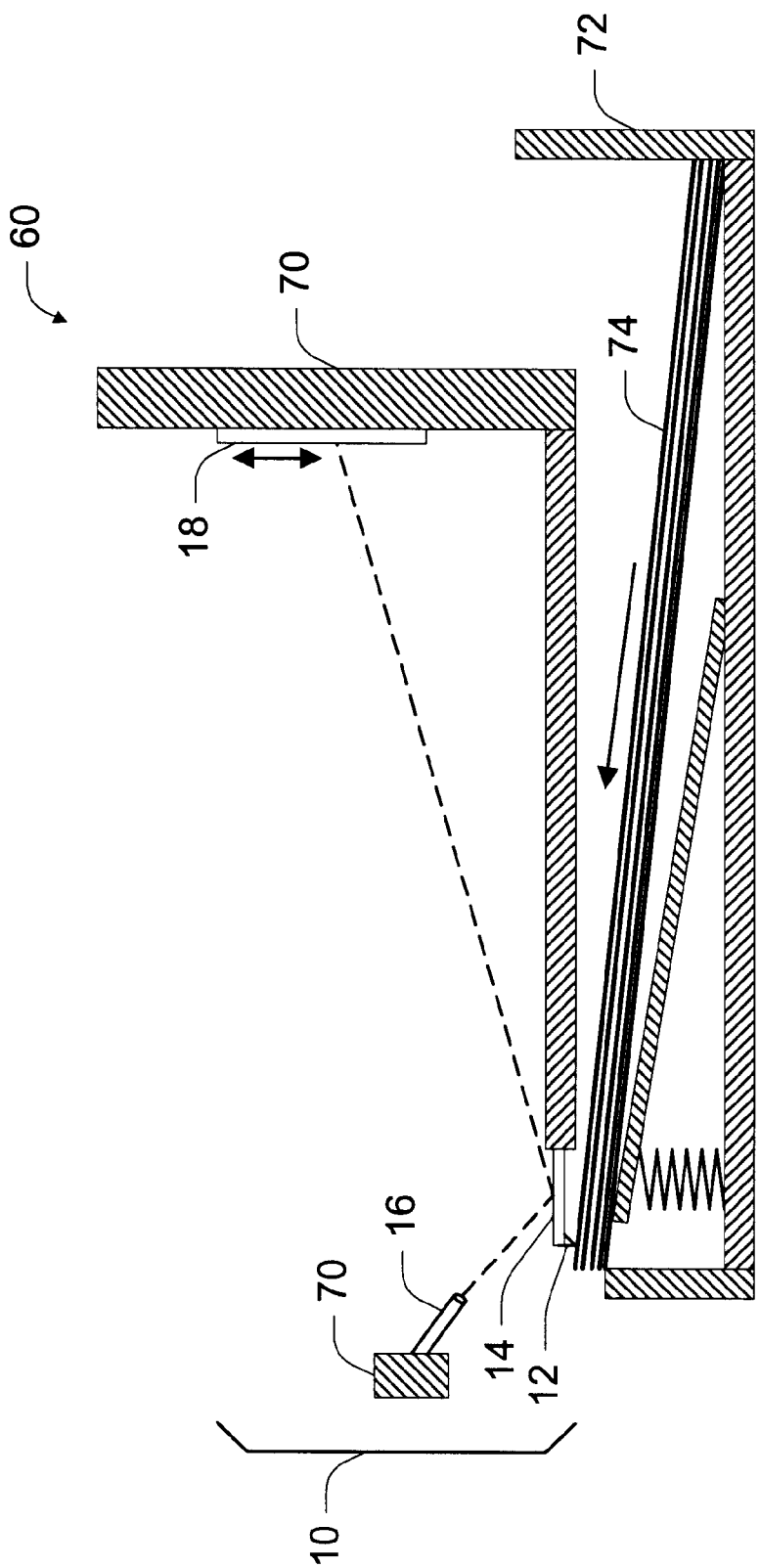
FIG. 7 is a side sectional view of a portion of the exemplary device of FIG. 6 which shows but one manner in which an inventive print media roughness detection mechanism can be employed.

FIG. 7 shows an exemplary portion of printer 60 that includes structure 70 that is utilized to support a portion of an exemplary roughness detection mechanism 10. A paper tray 72 holds a supply of paper 74 that is ready for use in the printer. As the paper is fed, piece by piece, into the printer, detection mechanism 10 is positioned in such a manner that surface engaging member 12 engages each piece of paper to ascertain the roughness of the paper. As the paper advances past the surface engaging member 12, the member is deflected in accordance with variations in the paper's roughness, or variations in the roughness as between different pieces of paper. This, in turn, causes light that is projected from light source 16 onto reflective member 14 to be reflected and moved in the vertical direction along the position detector 18. From the light movement along the position detector, a measure of the surface's roughness can be ascertained.

And, while the detection mechanism is illustrated as being positioned in a specific location in the figure, it is to be appreciated and understood that this illustration shows but one exemplary position that the detection mechanism 10 can occupy within a printer. Accordingly, the detection mechanism can be deployed at any suitable location within the printer.

In addition, it will be appreciated that other sensing techniques can be utilized to implement the inventive techniques discussed above. For example, various techniques, such as capacitance sensing, electromagnetic response sensing, and piezoelectric sensing, can be utilized.

Exemplary Control System

Figure 8:
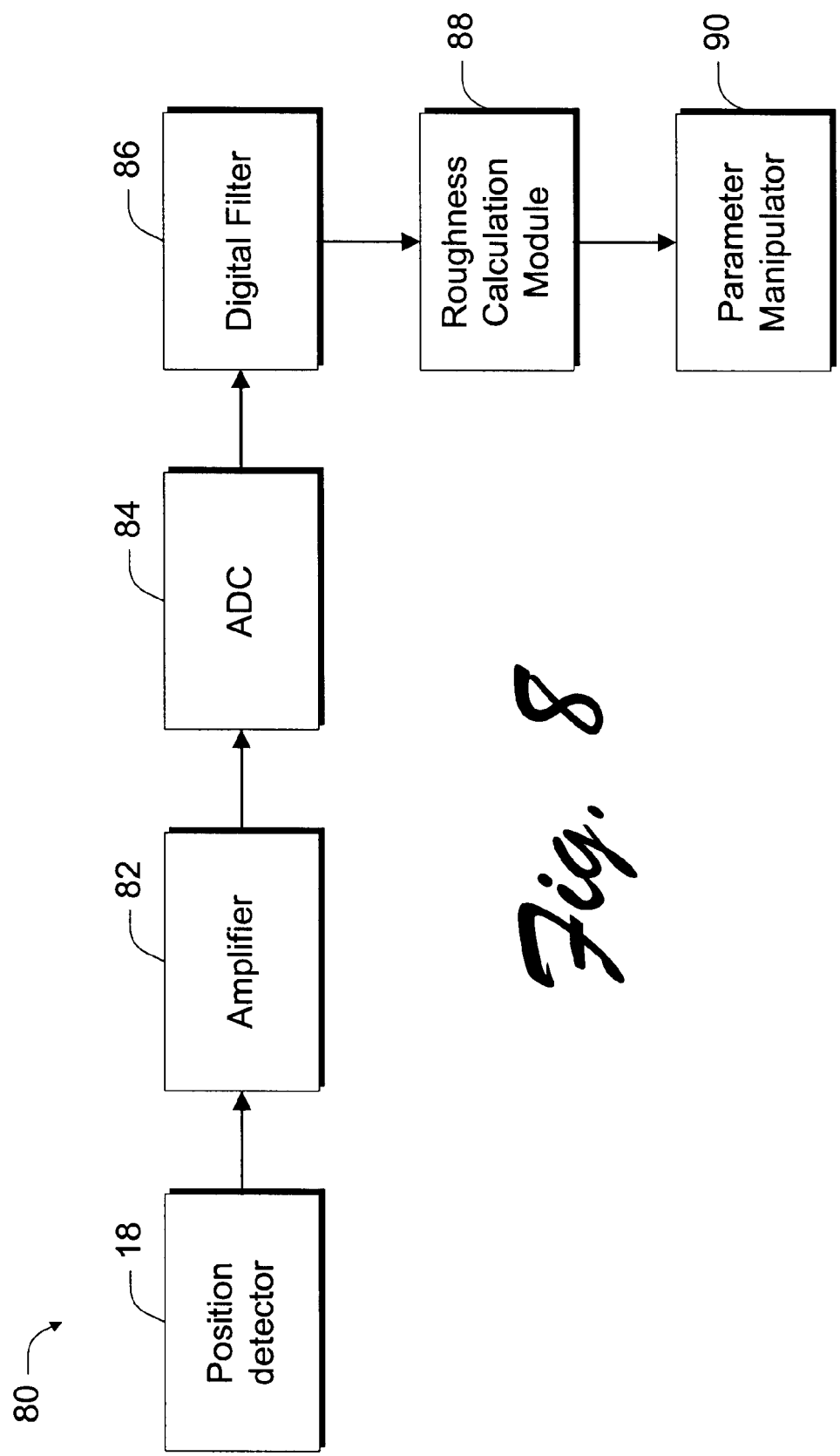
FIG. 8 is a high level block diagram of an exemplary control system in accordance with the described embodiment.

FIG. 8 shows an exemplary control system 80 that can be utilized in accordance with the embodiments described above. Control system 80 can include a position detector 18 as described above. The detector outputs an analog voltage that is associated with the movement of the reflected light on the photodetectors of the position detector. This voltage is amplified by an amplifier 82 and then provided to an analog-to-digital converter 84 which converts the analog voltage to a digital value. The digital value is then filtered by a digital filter 86 in the form of a high pass filter, such as a phase correct Gaussian filter. The output of the digital filter 86 is provided to a roughness calculation module 88 which integrates the voltage input to return a single voltage that represents a roughness value, such as an RMS (root mean square) value. This value can then be used, in the printer embodiments, to modulate print parameters, as by the illustrated parameter manipulator 90, that are associated with the printing that is to take place on the paper. Parameter manipulator 90 can be implemented in any suitable hardware, software, firmware, or combination thereof. Exemplary print parameters include, without limitation, fuser temperature, fusing time, and fusing speed. This value might be used by the parameter modulator 90, for example, in connection with a lookup table that contains exemplary parameter values that are associated with various roughness values. Thus, as the roughness value is determined, the lookup table is consulted to determine applicable print parameters that are to be utilized with that particular piece of paper.

In Operation

Figure 9:
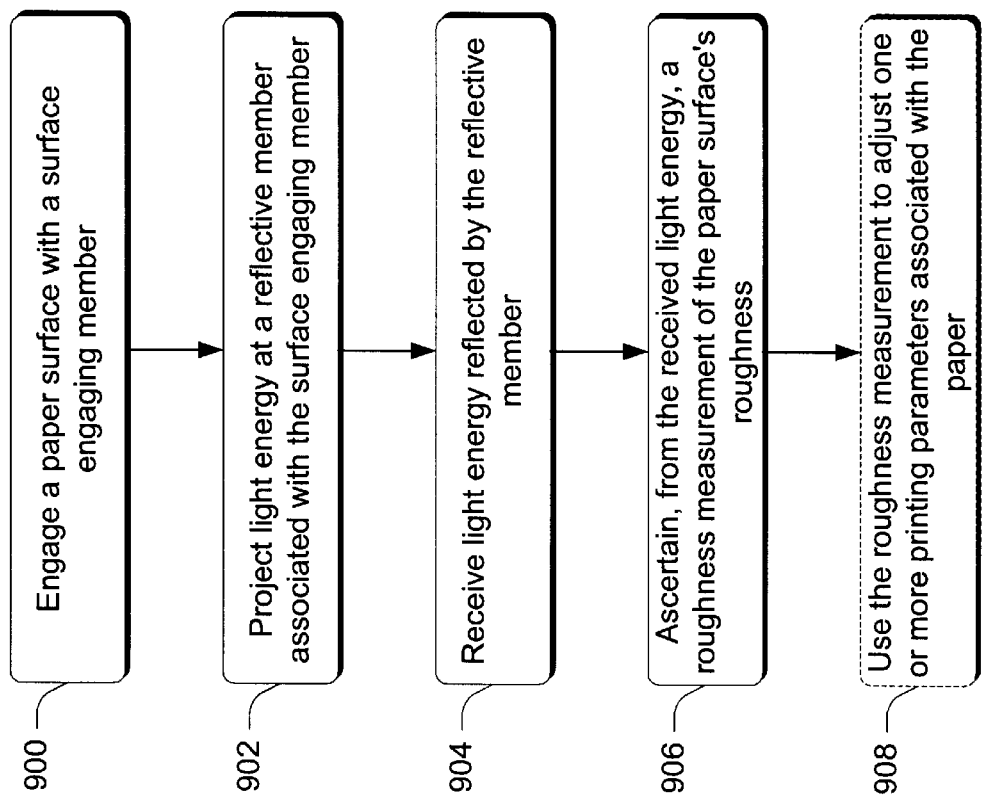
FIG. 9 is a flow diagram that describes steps in a method in accordance with the described embodiment.

FIG. 9 is a flow diagram of exemplary steps in a method in accordance with the described embodiment. The steps of the illustrated method can be implemented in any suitable hardware, software, firmware, or combination thereof. In one exemplary embodiment, the steps are implemented in connection with a printing device, such as the one described by FIGS. 6 and 7. It is to be understood, however, that other implementations, and particularly ones that are not necessarily associated with printing devices, can be provided to implement the method about to be described.

Step 900 engages a paper surface with a surface engaging member. FIG. 1 shows one exemplary construction that can be utilized to implement this step. It should be noted that while FIG. 1 shows a surface engaging member having a cantilevered construction, such is not necessarily a requirement of other surface engaging members that can be utilized. Accordingly, other constructions can be utilized without departing from the spirit and scope of the invention. Step 902 projects light energy at or towards a reflective member that is associated with the surface engaging member. Again, FIG. 1 shows but one exemplary way in which this step can be implemented. There, the reflective member is provided as an integral part of the surface engaging member. It is quite possible, however, for the reflective member to be provided as a separate component. Step 904 receives light that is reflected by the reflective member. In the illustrated example of FIG. 1, this step is implemented by a position detector 18 upon which the reflected light falls. The position detector is spaced from the reflective member and configured so that minute movements of the surface engaging member result in light movement along the position detector. Step 906 ascertains, from the received light, a roughness measurement of the paper surface's roughness. Specifically, the received light moves along the position detector as a function of the roughness of the paper's surface. Such light movement can then be processed to provide a roughness measurement or value that is associated with the roughness of the paper's surface. Step 908 is an optional step and can be implemented in connection with various printer embodiments. In this step, the roughness measurement is used to adjust one or more printing parameters associated with paper that is to be printed upon by a printer. Examples of printing parameters are given above.

Conclusion

The embodiments described above provide a simple, convenient way of detecting the surface roughness of a piece of paper. Advantages are achieved in a simple construction that is scalable for applications in devices such as printers. The described embodiments provide a standalone, self-sufficient, automated device that requires little or no outside user intervention. By virtue of its small size and light weight, the device is easily moved or transported from one location to another.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A print media roughness detection mechanism comprising:
    a surface-engaging member configured to physically engage a print media surface;
    a reflective member joined with the surface-engaging member and having a footprint;
    one or more light sources in operable proximity to the reflective member and configured to project light energy toward the reflective member from a position outside of the footprint; and
    a position detector mounted in operable proximity to and outside of the footprint of the reflective member and configured to receive light energy that is reflected from the reflective member, the surface-engaging member being configured for displacement by the print media's surface in accordance with variations in the roughness of the surface sufficiently so that light that is reflected by the reflective member and received by the position detector can be utilized to ascertain a measure of the print media's roughness.

2. The print media roughness detection mechanism of claim 1, wherein the surface-engaging member comprises a cantilevered structure.

3. The print media roughness detection mechanism of claim 1, wherein the reflective member is integral with the surface-engaging member.

4. The print media roughness detection mechanism of claim 1, wherein the reflective member comprises a separate component that is connected to the surface-engaging member.

5. The print media roughness detection mechanism of claim 1, wherein the one or more light sources comprise a laser.

6. The print media roughness detection mechanism of claim 1, wherein the one or more light sources comprise one or more LEDs.

7. The print media roughness detection mechanism of claim 1, wherein the position detector comprises a photodiode.

8. The print media roughness detection mechanism of claim 1, wherein the surface-engaging member comprises a flexure material body.

9. The print media roughness detection mechanism of claim 8, wherein the flexure material body comprises a metal flexure material body.

10. The print media roughness detection mechanism of claim 8, wherein the flexure material body comprises a first end and a second end spaced from the first end, the body tapering between the first and second ends.

11. The print media roughness detection mechanism of claim 8, wherein the flexure material body comprises a tip portion that is configured to engage the print media's surface, the tip portion being integral with the flexure material body.

12. The print media roughness detection mechanism of claim 8, wherein the flexure material body comprises a tip portion that is configured to engage the print media's surface, the tip portion being connected with the flexure material body.

13. A printing device embodying the print media roughness detection mechanism of claim 1.

* * * * *